(12) United States Patent
Hayashi

(10) Patent No.: US 6,812,618 B2
(45) Date of Patent: Nov. 2, 2004

(54) CONTROL APPARATUS FOR VIBRATION TYPE ACTUATOR

(75) Inventor: Tadashi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/022,338

(22) Filed: Dec. 20, 2001

(65) Prior Publication Data
US 2003/0006722 A1 Jan. 9, 2003

(30) Foreign Application Priority Data
Dec. 28, 2000 (JP) ........................................ 2000-400972

(51) Int. Cl.$^7$ .............................................. H02K 41/08
(52) U.S. Cl. ................................. 310/316.01; 310/317
(58) Field of Search ........................... 310/316.01, 12, 310/317, 316.02, 348

(56) References Cited

U.S. PATENT DOCUMENTS

| 5,459,369 A | 10/1995 | Mitarai et al. ............... 310/317 |
| 5,539,268 A | 7/1996 | Kataoka ...................... 310/316 |
| 5,841,215 A | 11/1998 | Takeishi ...................... 310/316 |
| 5,889,350 A | 3/1999 | Yamamoto .................... 310/316 |
| 5,939,851 A | 8/1999 | Kataoka et al. ............. 318/611 |
| 6,049,156 A | 4/2000 | Yamamoto et al. ..... 310/316.01 |
| 6,054,795 A | 4/2000 | Yamamoto et al. ..... 310/316.01 |
| 6,084,334 A | 7/2000 | Yamamoto et al. ..... 310/316.01 |
| 6,100,622 A | 8/2000 | Yamamoto et al. ..... 310/316.01 |
| 6,133,671 A | 10/2000 | Atsuta et al. ........... 310/316.01 |
| 6,313,564 B1 * | 11/2001 | Kataoka ...................... 310/316 |
| 6,411,008 B1 * | 6/2002 | Otsubo .................. 310/316.01 |
| 6,635,977 B2 * | 10/2003 | Kataoka ...................... 310/316 |

* cited by examiner

Primary Examiner—Thomas M. Dougherty
Assistant Examiner—Iraj Mohandesi
(74) Attorney, Agent, or Firm—Fitzpatrick, Cella, Harper & Scinto

(57) ABSTRACT

A control apparatus for a vibration type actuator improves controllability by providing a control circuit that adjusts a voltage to be applied to the actuator so that a slope of a frequency-speed characteristic of the actuator becomes approximately a constant slope.

17 Claims, 12 Drawing Sheets

CONTROL APPARATUS FOR VIBRATION TYPE ACTUATOR

BACKGROUND OF THE INVENTION

1. Field of the Invention and Related Art

The present invention relates to a control apparatus for a vibration type actuator, such as a vibration wave motor or the like.

2. Related Background Art

Generally, a vibration type actuator, such as a vibration wave motor or the like, includes a vibration member for making driving vibration and a contact member for press contacting the vibration member, whereby the driving vibration causes the vibration member and the contact member to move relative to one another.

The vibration member generally consists of an elastic member and a piezoelectric element functioning as an electro-mechanical energy conversion element. For example, the piezoelectric element may be disposed so as to have driving phases at positions having spatially a mutual phase difference of 90° for each driving phase of the elastic member, wherein alternating signals of two phases having a mutual phase difference of 90° are applied to these two driving phases to generate a travelling wave on the elastic member, and the contact member is press-contacted with the elastic member, thereby obtaining a frictional driving force therebetween.

A frictional material for obtaining the appropriate frictional force is adhered, coated or formed at the contact portion between the vibration member and the contact member.

When compared with an actuator using electromagnetic force, the driving torque of a vibration type actuator at low speed is large, responsiveness is excellent, and it is silent because a vibration above the human audible range is used, so humans do not sense any driving sound is generated. Therefore, the vibration type actuator is suitably used as, e.g., the driving unit of an image formation apparatus.

Generally, since a large voltage is necessary for a vibration type actuator, the voltage is boosted or raised by one method or a combination of plural methods. For example, a driving signal may be amplified by a linear amplifier, the voltage may be boosted by a transformer, or an inductance element and a switching element may be combined such that a resonance with the capacitance component of the vibration type actuator may be used.

In these methods described above, either the method of boosting the voltage using a transformer or the method of boosting the voltage using a combination of an inductance element and a switching element is desirably used because each is excellent in respects of efficiency, costs and the like.

Moreover, as methods of controlling the driving speed of the vibration type actuator, there are a method of controlling the driving speed using a driving voltage, a method of controlling the driving speed using a driving frequency, and a method of controlling the driving speed using a phase between adjacent driving phases. Of these methods, the method of controlling the driving speed using the driving frequency is desirably used because it can achieve both a wide dynamic range and high resolution alone, and is excellent when used with a recently developed digital circuit.

However, in the driving speed control method using the driving frequency, as shown in FIG. 4, a frequency-speed characteristic changes greatly according to the frequency, whereby there is a problem in that a change rate of the speed varies even at the same control operation amount.

Particularly, if the driving frequency is displaced from a resonance frequency (fr), a slope (i.e., the slope of the frequency curve for the speed) decreases, whereby there is a problem in that a necessary control gain can not be obtained and the speed does not decrease.

That is, there is a problem that controllability deteriorates in a low-speed range. Further, if the control gain is set at low speed, there is a problem in that oscillation occurs in high-speed driving. Particularly, when the vibration type actuator is used in positioning control, there is a problem in that a desired device can not be accurately stopped at a desired position.

SUMMARY OF THE INVENTION

An object of the present invention is to provide a control apparatus, for a vibration type actuator, which achieves steady driving by a simple manner in a wide range of the driving from high speed to low speed.

In one aspect, the present invention relates to a control apparatus and method for a vibration type actuator which makes driving vibration at a driving unit of a vibration member by applying an alternating signal to an electro-mechanical energy conversion element and uses at least a frequency of the alternating signal as a speed control parameter, where the apparatus comprises: a driving circuit capable of changing a driving voltage of the alternating signal to be applied to the electro-mechanical energy conversion element; and a control circuit for controlling the driving circuit so that at least an absolute value of a slope of a frequency-speed characteristic of the actuator is within a predetermined range in a frequency band of predetermined range.

In another aspect, the present invention relates to a control apparatus and method for a vibration type actuator which makes driving vibration at a driving unit of a vibration member by applying an alternating signal to an electro-mechanical energy conversion element and uses at least a frequency of the alternating signal as a speed control parameter, where the apparatus comprises: a driving circuit capable of changing a driving voltage of the alternating signal to be applied to the electro-mechanical energy conversion element; and a control circuit for controlling the driving circuit so that an absolute value of a slope of a frequency-speed characteristic of the actuator is a predetermined value or greater at least in a frequency band of predetermined range.

In another aspect, the present invention relates to a control apparatus and method for a vibration type actuator which makes driving vibration at a driving unit of a vibration member by applying an alternating signal to an electro-mechanical energy conversion element and controls at least a frequency of an alternating signal as a speed control parameter, where the apparatus comprises: a driving circuit capable of changing a driving voltage of the alternating signal to be applied to the electro-mechanical energy conversion element; and a control circuit for at least performing control in a frequency range higher than a predetermined frequency so that the driving voltage to be applied to the electro-mechanical energy conversion element by the driving circuit decreases as the predetermined frequency becomes a higher frequency.

Other objects of the invention will become apparent from the following embodiments which will be explained with reference to the attached drawings.

DESCRIPTION OF THE PREFERRED EMBODIMENTS

First Embodiment

Figure 1:
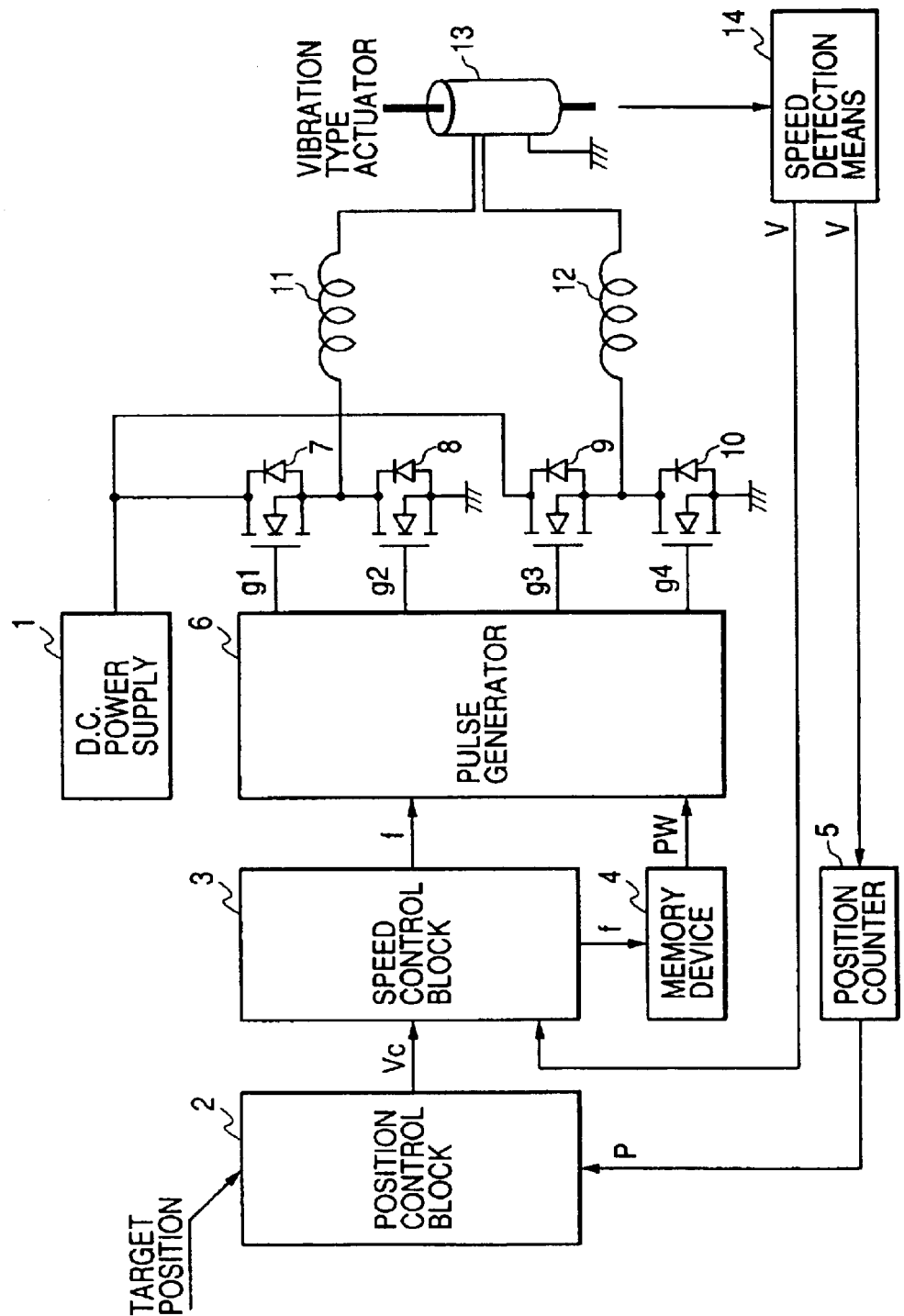
FIG. 1 is a block diagram showing a first embodiment of the present invention.
Figure 2:
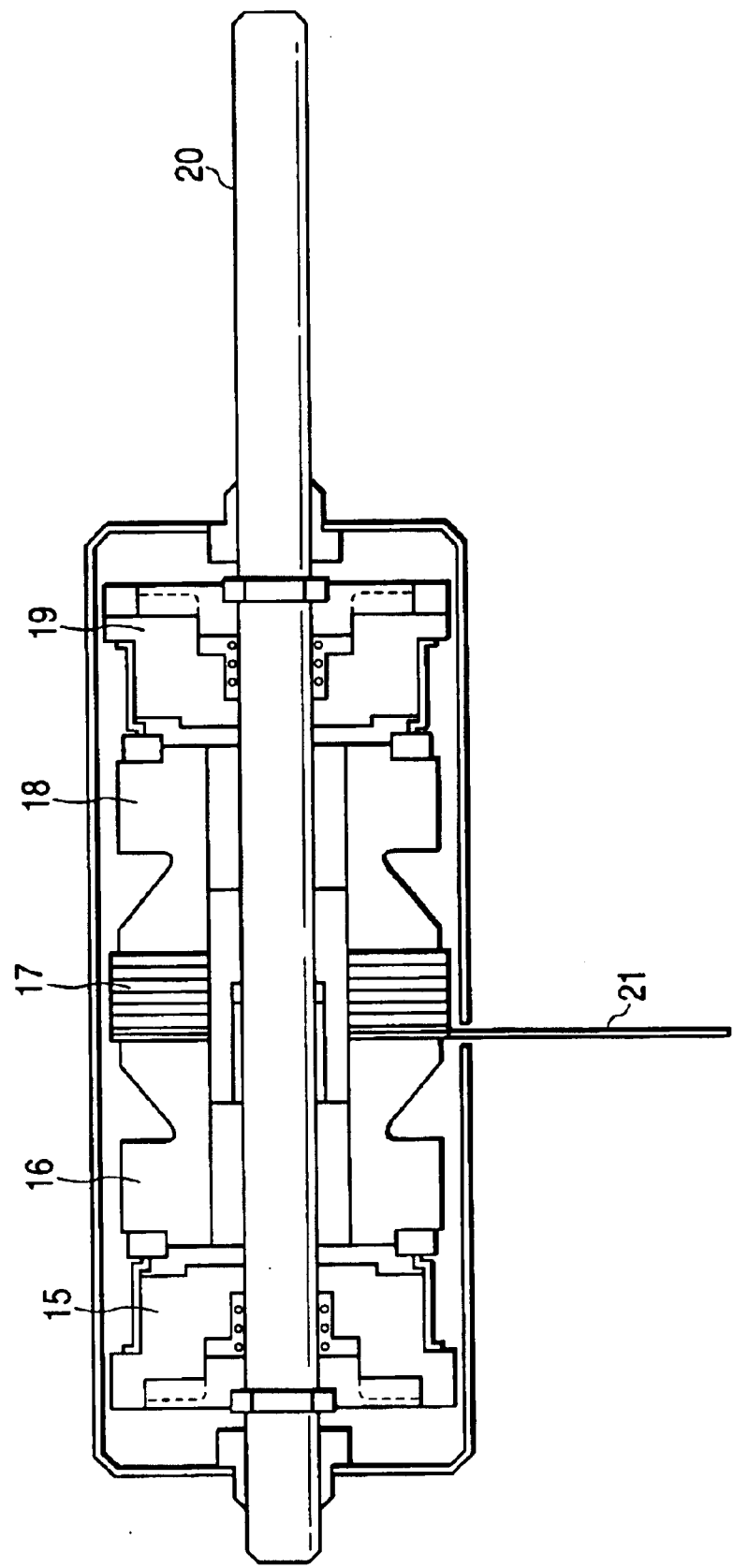
FIG. 2 is a cross-sectional view showing the structure of an example of a vibration type actuator in the present invention.
Figure 3:
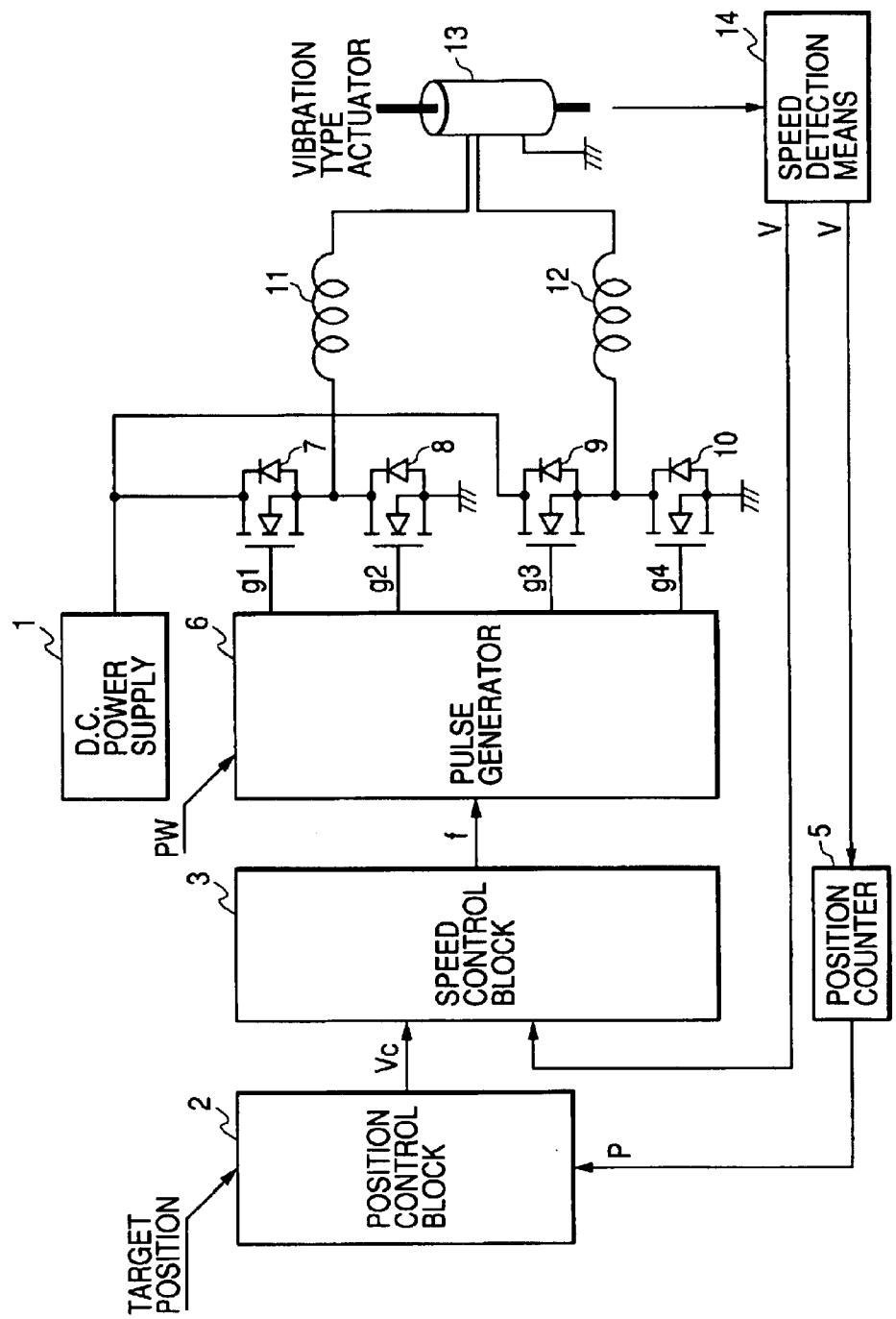
FIG. 3 is a block diagram showing a conventional control apparatus corresponding to the present invention.

FIG. 1 is a block diagram showing a first embodiment of the present invention, FIG. 2 is a cross-sectional view showing an example of a vibration type actuator which can effectively implement the present invention, and FIG. 3 is a block diagram showing a conventional positioning circuit corresponding to the circuit shown in FIG. 1.

In the vibration type actuator shown in FIG. 2, both sides of a laminated piezoelectric element 17, which has plural sets of two driving phases disposed at positions having spatially a mutual phase difference of 90°, are disposed (sandwiched) and supported between elastic members 16 and 18. By applying alternating signals of two phases having a mutual phase difference of 90° to the two driving phases of the piezoelectric element 17, travelling waves as driving vibrations are generated on the outer surfaces of the respective elastic members 16 and 18, and rotation members 15 and 19, functioning as contact members, are press-contacted with the elastic members 16 and 18, respectively, thereby obtaining a frictional driving force therebetween. Here, for example, plural ranges respectively having different polarization directions are provided in each driving phase. Thus, for one driving phase, displacements of expansion and shrinking are simultaneously given in the thickness direction (axial direction) by applying sine-wave alternating signals to the ranges of the different polarization directions, whereby bending vibration is made. Similarly, for the other driving phase, a bending vibration is made by applying cosine-wave alternating signals. Moreover, in a case where the polarization ranges of the respective driving phases are turned to the same polarization direction, phase-inverted alternating signals are applied.

When the actuator is driven, pulses having arbitrary pulse widths and frequencies and having a mutual phase difference of 180° are applied to the gates of MOSFET's (metal oxide semiconductor field-effect transistors) 7 and 8 for one driving phase connected to a coil 11 and to the gates of MOSFET's 9 and 10 for the other driving phase connected to a coil 12.

Figure 11:
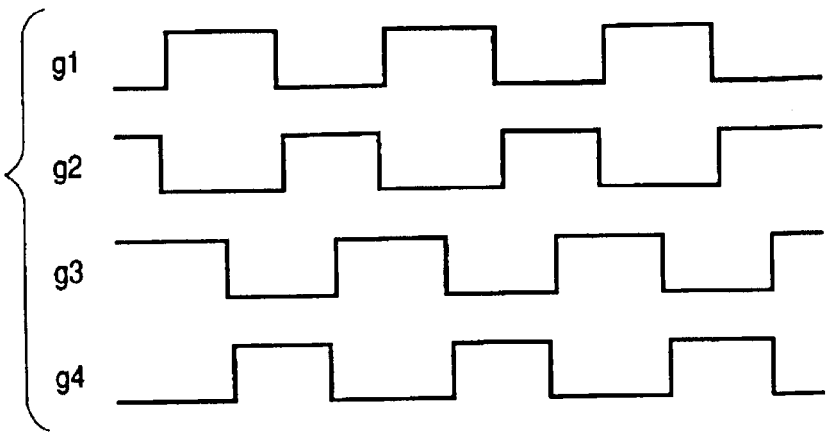
FIG. 11 is a view showing pulses for driving a MOSFET in a conventional example.

That is, the switching pulse is set to have the phases 0°, 180°, 90° and 270° in due order from g1 to g4, with a pulse width of approximately 50%, as shown in FIG. 11. When the pulse is inverted, it is set to have the phases 0°, 180°, −90° and 270° in due order from g1 to g4. The value of the coil is set to match the capacitance of the vibration type actuator. Actually, the resonance frequencies of the coil and the capacitance are set to be higher than the resonance frequency of the actuator so as to moderate a change rate of a voltage.

Figure 5:
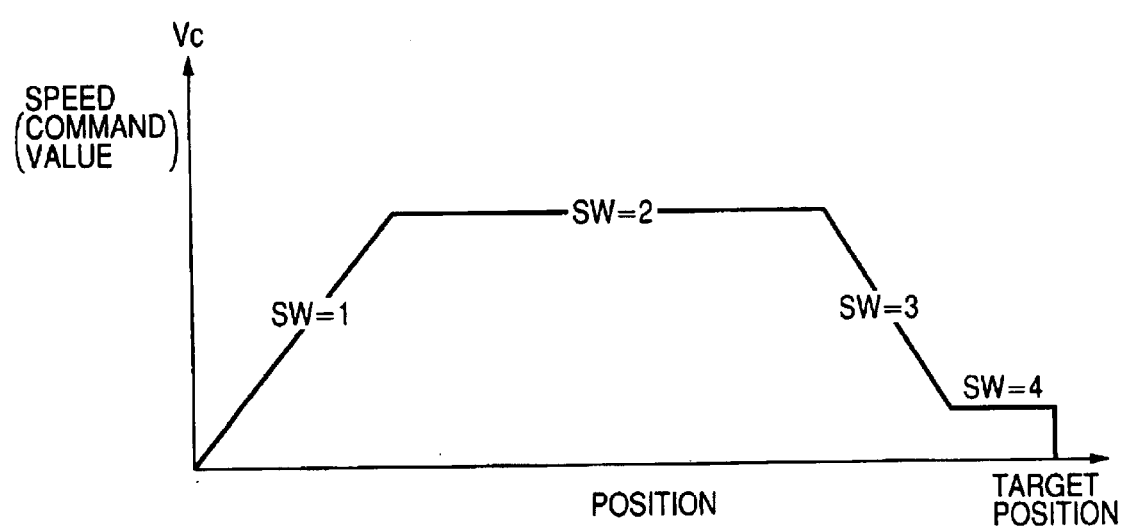
FIG. 5 is a view showing an example of a speed command in position control.

FIG. 3 shows an example of a conventional positioning control circuit. In the control circuit of a conventional vibration type actuator 13, a speed signal v of speed detection means 14, such as a known rotary encoder or the like for detecting rotation of the vibration type actuator 13, is converted into a position signal P by a position counter 5. Then, a speed command Vc according to the current position is generated by a position control block 2 so as to reach the target position, e.g., as shown in FIG. 5. Further, a frequency f of the pulse for driving the vibration type actuator is determined based on the speed command Vc, the speed signal V from the speed detection means 14, a control gain and the like by a speed control block 3, and the determined frequency f is output to a pulse generator 6.

A pulse width PW of a pulse generated by the pulse generator 6 is set to have a predetermined value irrespective of the command frequency f.

The pulses of four phases are generated based on the command frequency f and the pulse width PW by the pulse generator 6 to drive MOSFET's 7 to 10, whereby the vibration type actuator 13 is driven through coils 11 and 12.

Figure 4:
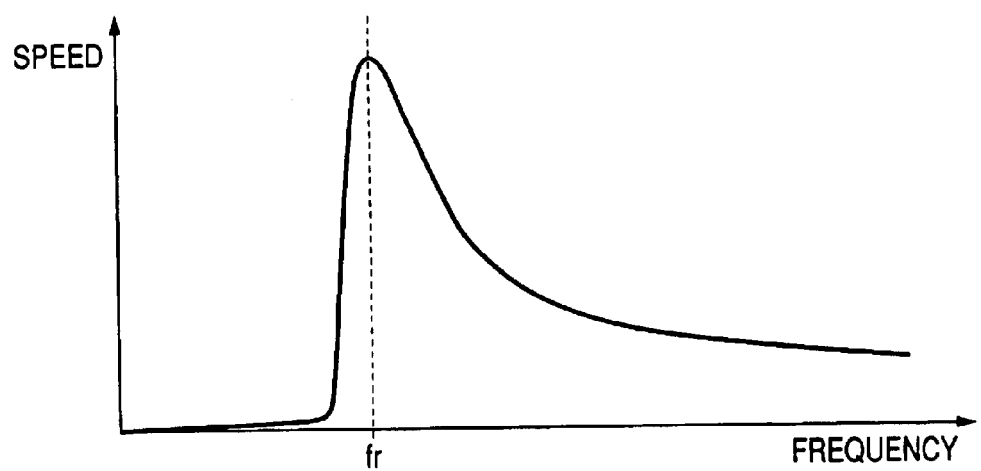
FIG. 4 is a view showing a frequency-speed characteristic of the vibration type actuator in the present invention.

Since the vibration type actuator 13 has the frequency-speed characteristic (i.e., the speed characteristic for the change in a unit amount of the frequency) as shown in FIG. 4, the speed can be controlled by adjusting the frequency. However, since the slope of the frequency-speed characteristic changes greatly according to the frequency, there is a fear that satisfactory control can not be performed according to the speed range. Particularly, the gain does not suffice in low speed. In positioning control, to improve the stop accuracy and decrease an impulsive sound at the time of start and stop, speed control as shown in FIG. 5 is performed. In this case, it is necessary to perform steady speed control within a wide speed range. Particularly, stability in the low-speed range is important. Moreover, since the speed does not decrease sufficiently in a predetermined frequency range, there is a fear that it may cause an overrun.

On the other hand, in the first embodiment of the present invention, as shown in FIG. 1, a pulse width PW corresponding to a frequency command f generated by a speed control block 3 is stored beforehand in a known memory device 4, such as a RAM, a ROM or a gate array, and thus the pulse width PW according to the frequency command f is output to the pulse generator 6.

Figure 6:
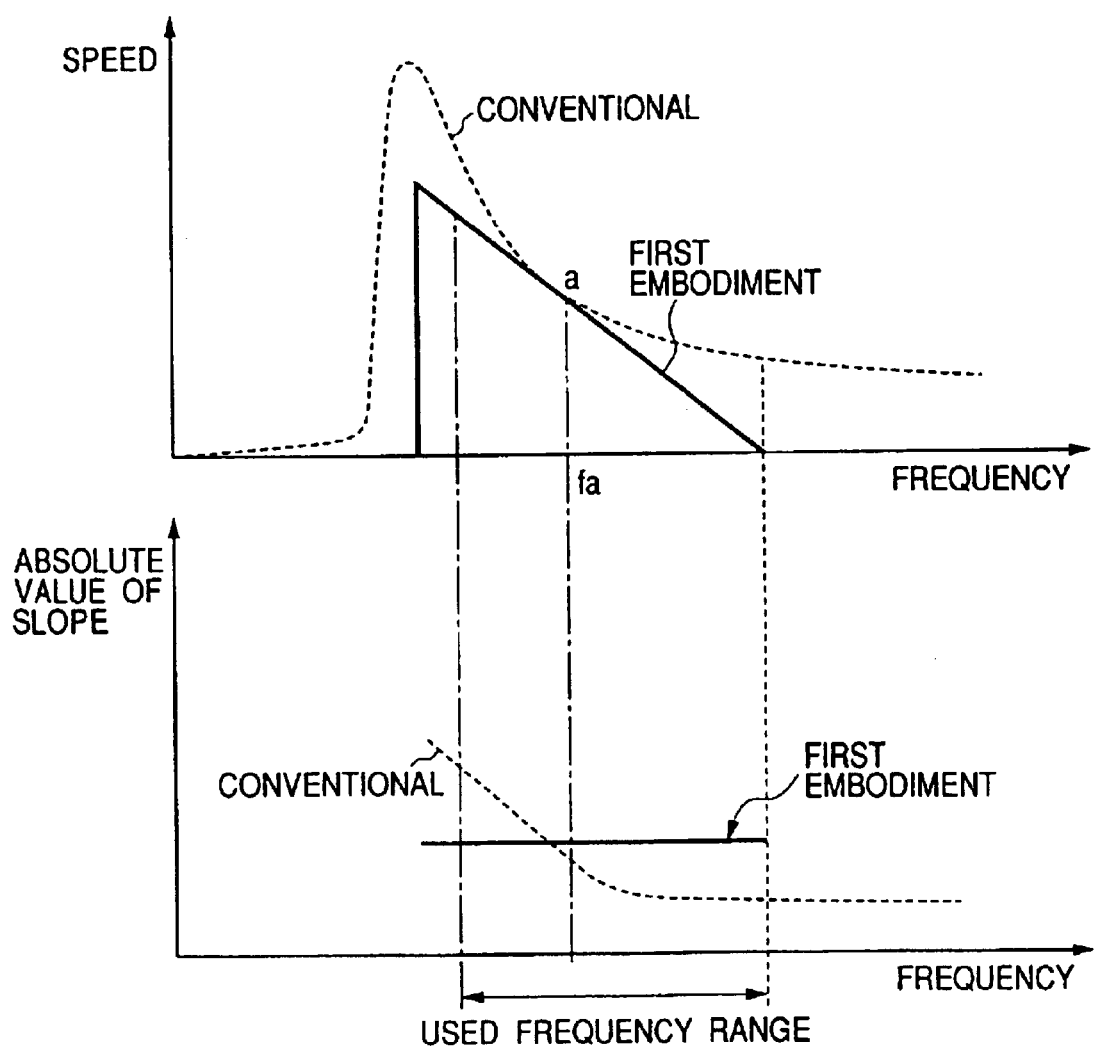
FIG. 6 is a view showing the frequency-speed characteristics of the vibration type actuator, in the first embodiment of the present invention and a conventional control circuit.

A table for the frequency commands f and the pulse widths PW is set beforehand by experiment or study so that the absolute value of the slope of the frequency-speed characteristic can secure a gain sufficient for control or can be set in a predetermined range. FIG. 6 shows the frequency-speed characteristics in the conventional art and the first embodiment.

Figure 12:
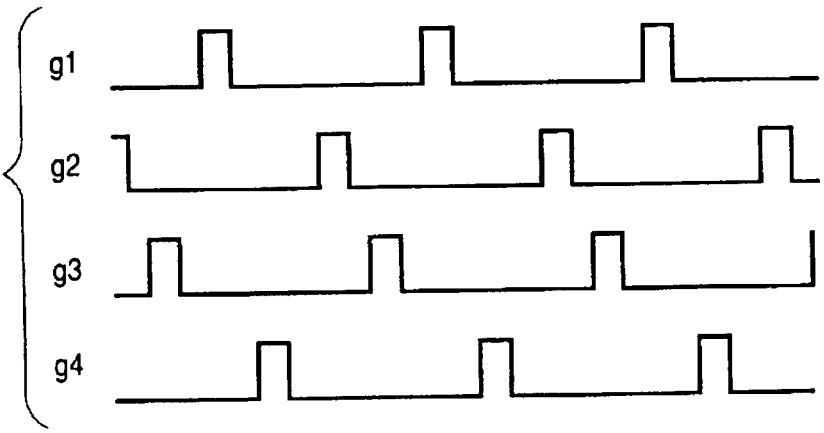
FIG. 12 is a view showing a state in which pulses for driving a MOSFET are squeezed (compacted) in the present invention.

In the first embodiment, the pulse width for the frequency is determined so that the frequency-speed characteristic almost becomes a straight line. That is, the pulse width is maximum at a point "a" (frequency fa), and the pulse width is squeezed (compressed) at points above and below point a (above and below frequency fa). FIG. 12 shows the state in which the pulses are squeezed (compressed) but having the same frequency as that in FIG. 11. As a result, since the response to the control command becomes the same at any frequency, a steady control can be performed in a wide speed range from high speed to low speed, whereby it is suitable for positioning control.

Figure 13:
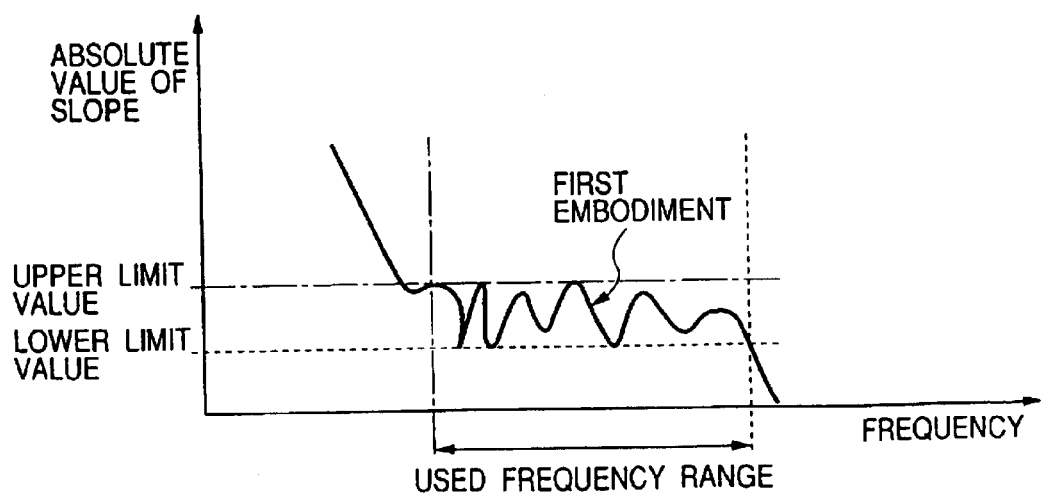
FIG. 13 is a view showing the frequency-speed characteristic of the vibration type actuator in the first embodiment of the present invention.

Incidentally, it is difficult to make the frequency-speed characteristic linear accurately and completely. However, as shown in FIG. 13, there is no problem even if a range of the slope of the frequency-speed characteristic is determined and the slope is made to be put within this range.

Figure 7:
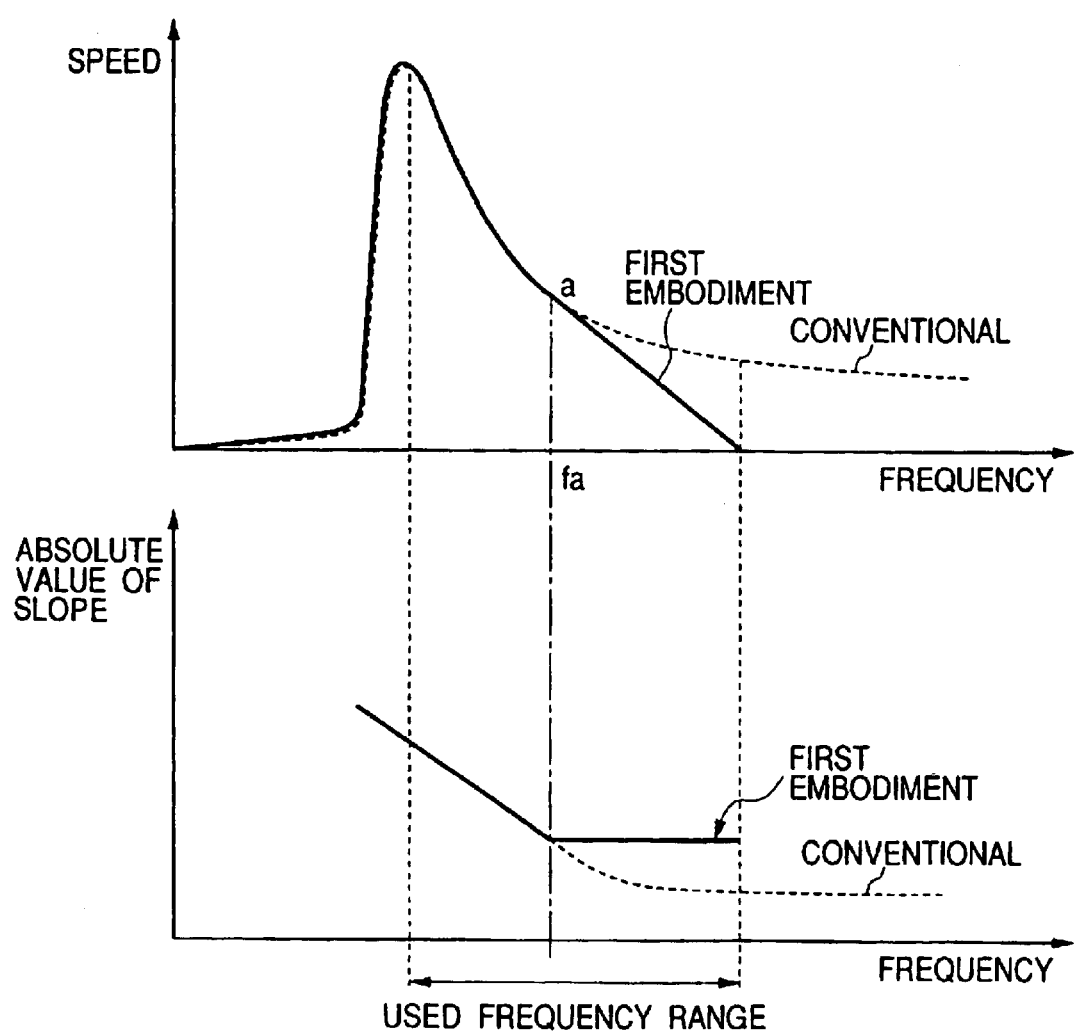
FIG. 7 is a view showing the frequency-speed characteristics of the vibration type actuator, in a modification of the first embodiment and the conventional control circuit.

Further, if the necessary gain only has to be secured, it is also effective to set the absolute value of the slope of the frequency-speed characteristic of the vibration type actuator to be a predetermined value or greater, as shown in FIG. 7. In this case, the pulse width is squeezed (compressed) at the frequency above a point "a" (frequency fa). Although the frequency-speed characteristic does not become linear entirely in the used frequency range, control can be performed in a wide speed range because the necessary control gain can be secured. In this case, control becomes possible even as for farther higher speed. Although an apparatus for positioning control has been described in the first embodiment, the same effect as above can be obtained if the embodiment is applied to an apparatus only for speed control.

Second Embodiment

Figure 8:
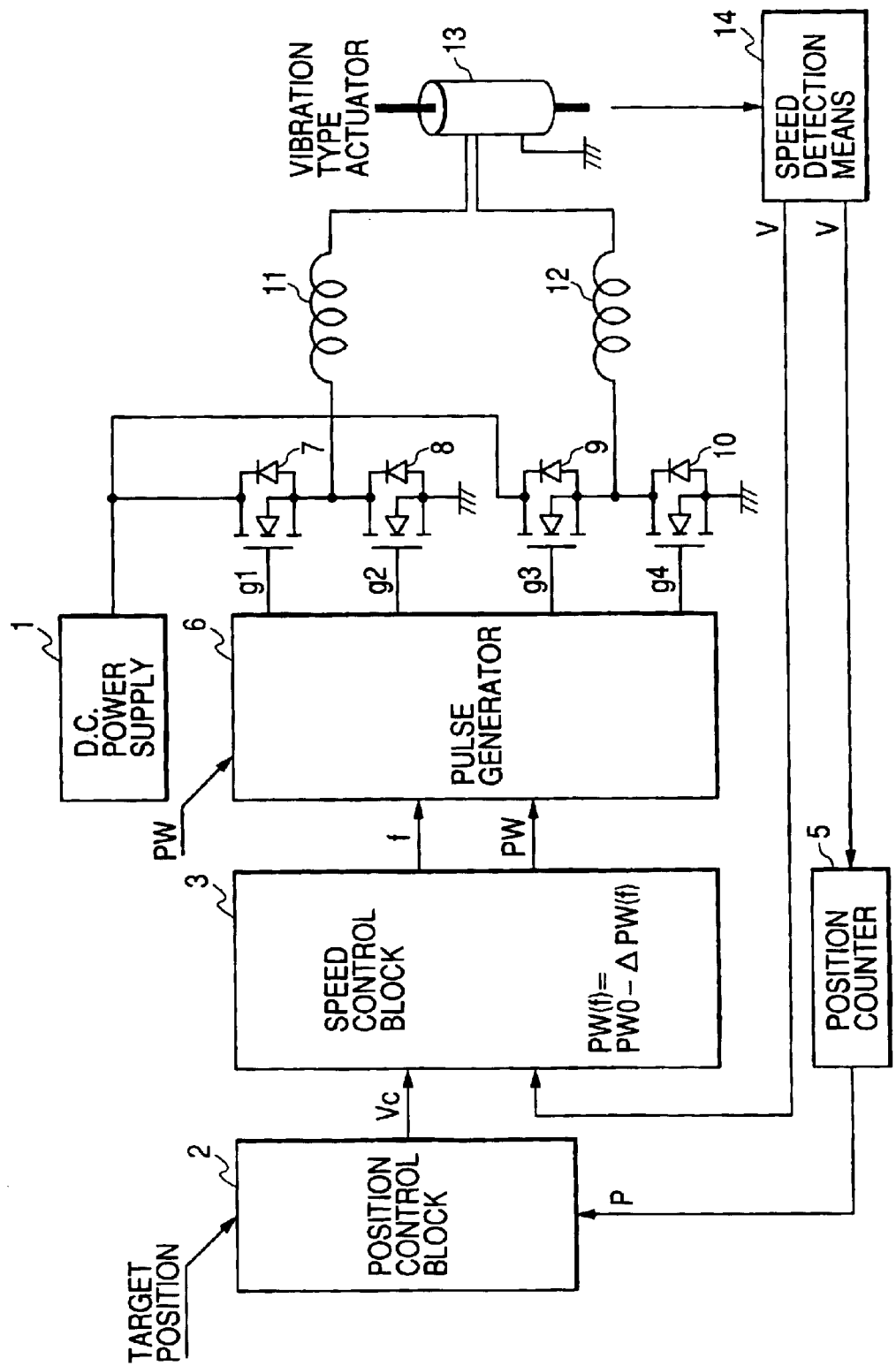
FIG. 8 is a block diagram showing a second embodiment of the present invention.

FIG. 8 shows a second embodiment of the present invention.

It should be noted that, in the second embodiment, the explanation of the same parts as those in the first embodiment will be omitted. According to the second embodiment, in a speed control block 3 which consists of a logic circuit, such as a known CPU, a gate array or the like, a reduction number $\Delta PW(f)$ of the pulse width is calculated from a command frequency f, and thus a command pulse width PW is determined.

For example, the reduction number of the pulse width can be calculated from the frequency fa at the point "a" of FIG. 6 and the command frequency f by using an equation $\Delta PW(f)=k|f-fa|$. Here, the value of k which is a constant is set so that the slope of the frequency-speed characteristic of the vibration type actuator is set within an almost-constant predetermined range. In the second embodiment, a memory element is not necessary; its function can be achieved by using the element shared with another block, such as the CPU or the gate array.

Incidentally, if the pulse width is decreased only in the case of f>fa, the same effect as that shown in FIG. 7 of the first embodiment can be obtained, whereby control becomes possible as for higher speed.

Although an apparatus for positioning control has been described in the second embodiment, the same effect as above can be obtained if the embodiment is applied to an apparatus only for speed control.

Third Embodiment

Figure 9:
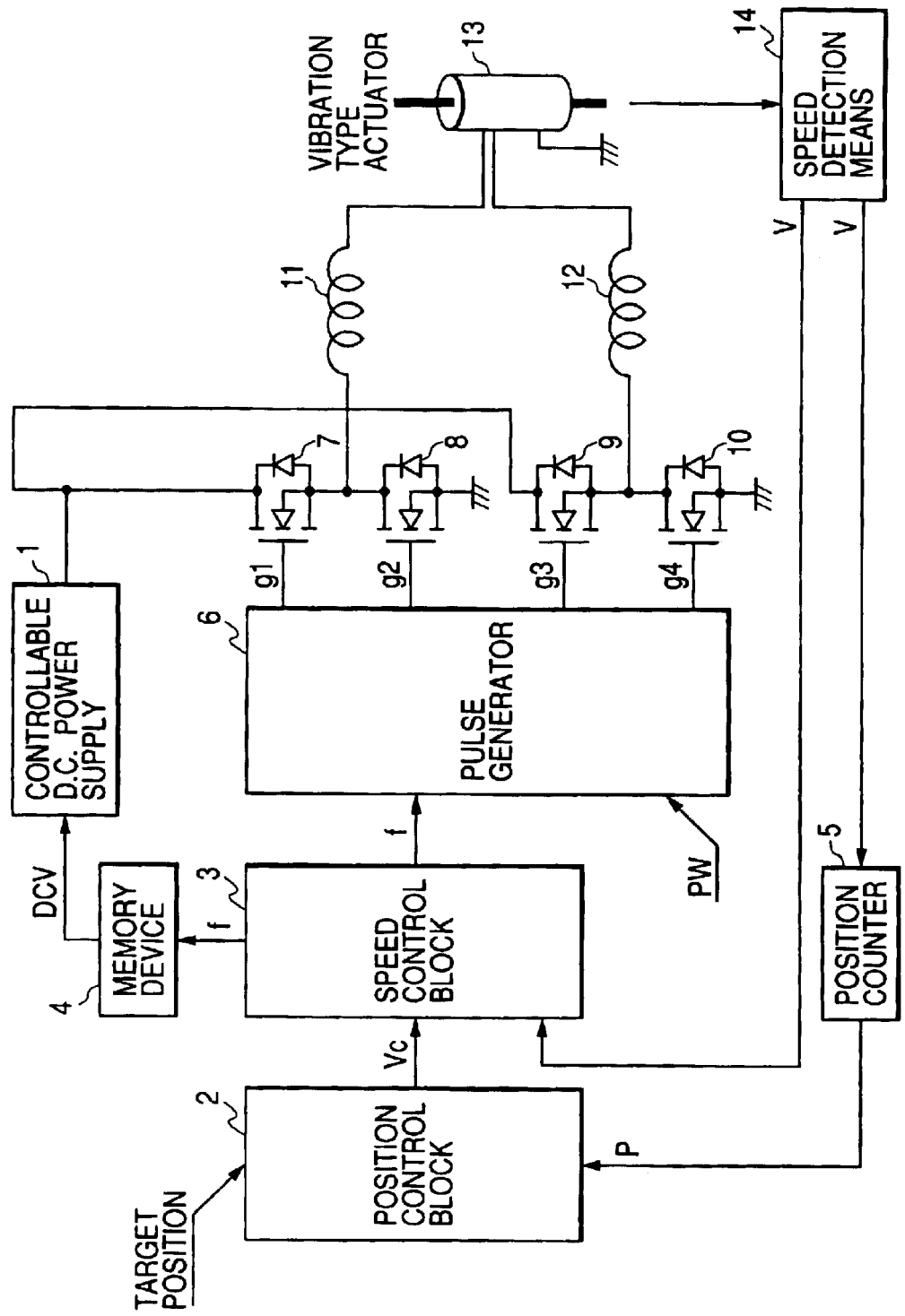
FIG. 9 is a block diagram showing a third embodiment of the present invention.

FIG. 9 shows a third embodiment of the present invention. It should be noted that, in the third embodiment, the explanation of the same parts as those in the first embodiment will be omitted.

According to the third embodiment, a DC power supply 1 is a controllable power supply which can control a voltage using a digital signal, a voltage and other means. A memory device 4, which stores a table for a frequency and a voltage value command DCV of the DC power supply, outputs the command voltage DCV to the DC power supply 1 in accordance with a command frequency f output from a speed control block 3.

As in the first and second embodiments, in order to be able to secure a gain sufficient for control, the third embodiment is set so that the absolute value of the slope of the frequency-speed characteristic of the vibration type actuator is set within a predetermined range.

That is, the voltage of the DC power supply is decreased at the upper and lower portions of the driving frequency range (high-frequency portion and low-frequency portion within the frequency range used for driving). Therefore, the amplitude in the part where the voltage of the DC power supply was decreased becomes small, whereby speed decreases. The effect obtained by doing so is the same as the effect in the first embodiment.

Further, if it is to only secure the necessary gain, the voltage of the DC power supply may be decreased at a predetermined frequency, higher than the resonance frequency of the vibration type actuator, or more. Moreover, as in the second embodiment, a reduction rate of the voltage of the DC power supply to the frequency may be calculated by the speed control block.

Fourth Embodiment

Figure 10:
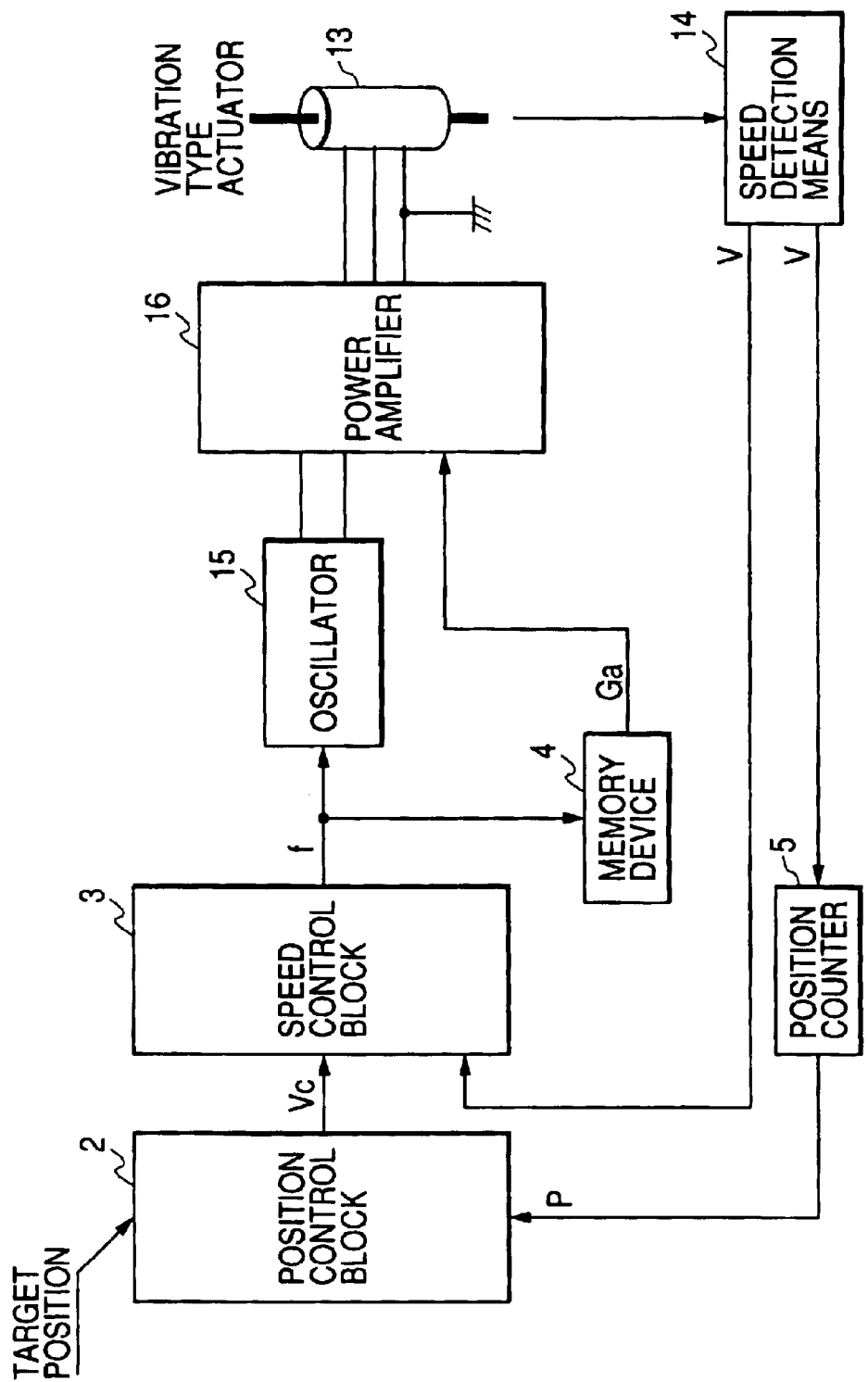
FIG. 10 is a block diagram showing a fourth embodiment of the present invention.

FIG. 10 shows a fourth embodiment of the present invention. It should be noted that, in the fourth embodiment, the explanation of the same parts as those in the first embodiment will be omitted. In FIG. 10, numeral 15 denotes an oscillator which performs oscillation at a frequency according to a frequency command f output from a speed control block 3, such as a known VCO (voltage-controlled oscillator). Numeral 16 denotes a power amplifier to which a gain command Ga can be set externally. A memory device 4, which stores a table for a frequency and the gain command Ga of the power amplifier 16, outputs the gain command Ga of the power amplifier 16 in accordance with the frequency command f output by the speed control block 3. As in the first and second embodiments, in order to be able to secure a gain sufficient for control, the fourth embodiment is arranged so that the absolute value of the slope of the frequency-speed characteristic of the vibration type actuator is set within a predetermined range.

That is, the gain of the power amplifier 16 is decreased at the upper and lower portions of the driving frequency range. The effect obtained by doing so is the same as the effect in the first embodiment.

Further, if it is to only secure the necessary gain, the gain of the power amplifier 16 may be decreased at a predetermined frequency, higher than the resonance frequency of the vibration type actuator, or more. Moreover, as in the second embodiment, a reduction rate of the gain of the power amplifier 16 to the frequency may be calculated by the speed control block.

Fifth Embodiment

Figure 14:
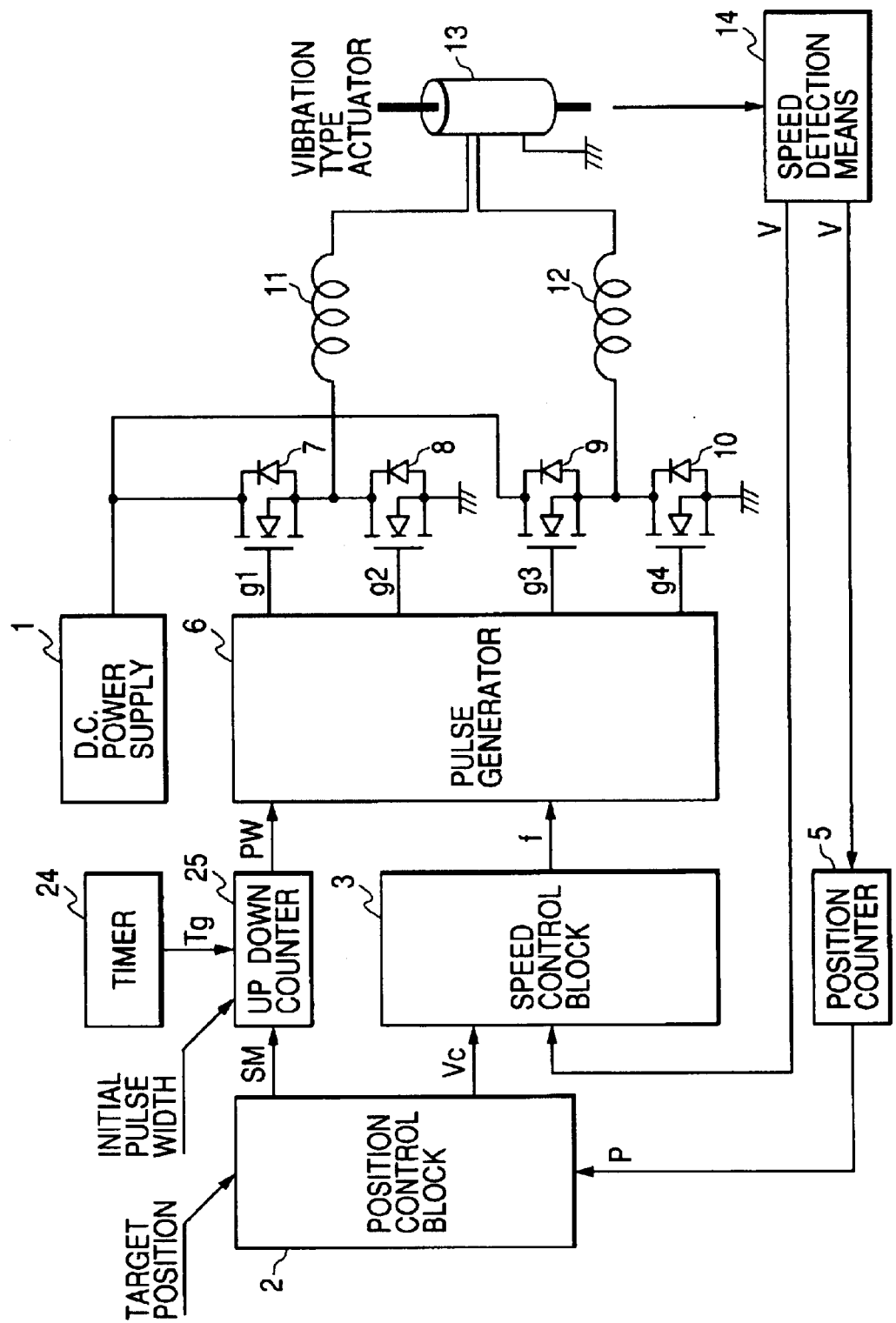
FIG. 14 is a block diagram showing a fifth embodiment of the present invention.

FIG. 14 is a block diagram showing a fifth embodiment of the present invention. Here, a timer 24 generates a trigger signal Tg at a constant interval, and an up down counter 25 performs up and down count in accordance with the trigger signal Tg from the timer 24. Further, a position control block 2 generates a speed command Vc, as shown in FIG. 5, and also generates a control state signal SM.

Figure 15:
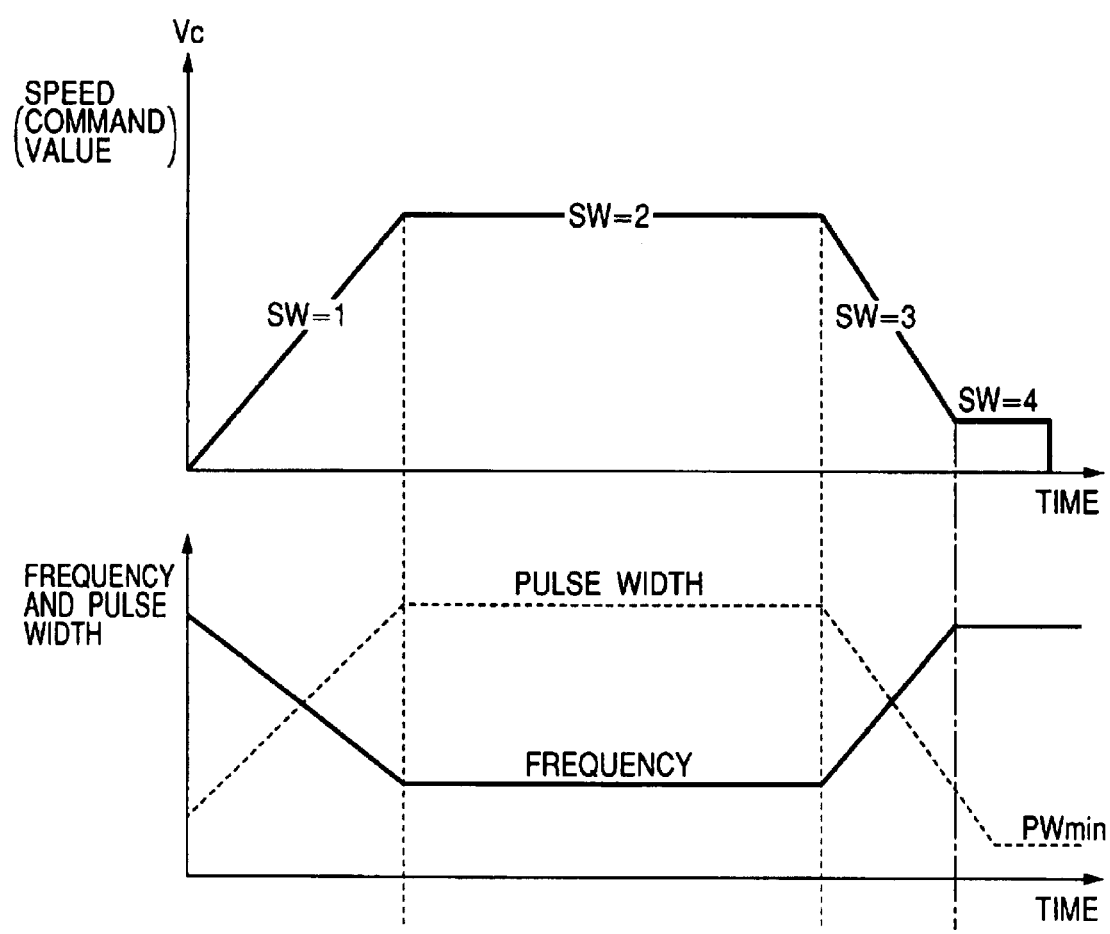
FIG. 15 is a view showing an operation in the fifth embodiment.

The operation of the up down counter 25 is determined by the value of the control state signal SM. As shown in FIG. 15, at the time of acceleration (SM=1), the pulse width increases from the initial pulse width whenever the trigger signal Tg is input, while at the time of deceleration (SM=3, 4), the pulse width decreases whenever the trigger signal Tg is input. Since the frequency-speed characteristic of the vibration type actuator is as shown in FIG. 4, the driving frequency decreases most at constant speed, and, on the other hand, the driving frequency increases at the time of acceleration and deceleration. At this time, a period in which the timer generates the trigger signal Tg and amounts of increase and decrease of the pulse width are appropriately set so that the frequency-speed characteristic of the vibration type actuator has a curve the same as the curve shown in FIG. 7. The changes of the frequency and the pulse width at this time are shown in FIG. 15. Also in this case, since the frequency-speed characteristic is corrected so as to become nearly linear, as in the first to fourth embodiments, controllability in each speed range becomes steady.

Here, although both the cases of acceleration and deceleration were explained, the above operation alternatively may be performed only at the time of deceleration (SM=3, 4), which is most important for positioning accuracy. Further, it is also effective to perform the above operation only when SM=3 in some deceleration, to prevent the stop unanticipated at low speed, and to set a limit value PWmin for the pulse width, as shown in FIG. 15, so that the pulse generator does not output a pulse width below the limit value.

In the above description, although the pulse width was explained as a parameter to correct the frequency-speed characteristic of the vibration type actuator, it is, of course, also effective to directly modify the applied voltage, the voltage of the DC power supply, the gain of the linear amplifier or the like at a constant period.

What is claimed is:

1. A control apparatus for a vibration type actuator, which makes driving vibration at a driving unit of a vibration member by applying an alternating signal to an electro-mechanical energy conversion element and uses at least a frequency of the alternating signal as a speed control parameter, said control apparatus comprising:

a driving circuit capable of changing a voltage of the alternating signal to be applied to said electro-mechanical energy conversion element; and a control unit communicatively coupled to said driving circuit, wherein said control unit causes said driving circuit to change the voltage of the alternating signal so that at least an absolute value of a slope of a frequency-speed characteristic of said actuator is within a desired range in a frequency band of predetermined range.

2. A control apparatus for a vibration type actuator, which makes driving vibration at a driving unit of a vibration member by applying an alternating signal to an electro-mechanical energy conversion element and uses at least a frequency of the alternating signal as a speed control parameter, said control apparatus comprising:

a driving circuit capable of changing a voltage of the alternating signal to be applied to said electro-mechanical energy conversion element; and a control unit communicatively coupled to said driving circuit, wherein said control unit causes said driving circuit to change the voltage of the alternating signal so that an absolute value of a slope of a frequency-speed characteristic of said actuator is equal to or greater than a predetermined value at least in a frequency band of predetermined range.

3. An apparatus according to claim 1, wherein said control circuit sets a change rate of the voltage relative to the frequency.

4. An apparatus according to claim 2, wherein said control circuit sets a change rate of the voltage relative to the frequency.

5. An apparatus according to claim 1, wherein said driving circuit includes a switching circuit which performs on and off operations in response to a driving pulse and applies a voltage according to the switching operation of said switching circuit to said electro-mechanical energy conversion element, and said control unit changes the width of the driving pulse according to the frequency so that the absolute value of the slope of the frequency-speed characteristic of said actuator is within the predetermined range.

6. An apparatus according to claim 2, wherein said driving circuit includes a switching circuit which performs on and off operations in response to a driving pulse and applies a voltage according to the switching operation of said switching circuit to said electro-mechanical energy conversion element, and said control unit changes the width of the driving pulse according to the frequency so that the absolute value of the slope of the frequency-speed characteristic of said actuator is equal to or greater than the predetermined value.

7. An apparatus according to claim 1, further comprising a detection circuit which detects a speed and/or a position of said vibration type actuator, wherein said control unit changes the voltage on the basis of detection information from said detection circuit if said actuator reaches a predetermined position or a predetermined movement amount.

8. A control apparatus for a vibration type actuator, which makes driving vibration at a driving unit of a vibration member by applying an alternating signal to an electro-mechanical energy conversion element and controls at least a frequency of an alternating signal as a speed control parameter, said control apparatus comprising:

a driving circuit capable of changing a voltage of the alternating signal to be applied to said electro-mechanical energy conversion element; and a control unit communicatively coupled to said driving circuit, wherein said control unit controls said driving circuit in a frequency range higher than a predetermined frequency so that the voltage of the alternating signal decreases as the predetermined frequency becomes a higher frequency.

9. An apparatus according to claim 8, wherein said control unit decreases the voltage to be applied to said electro-mechanical energy conversion element as the predetermined frequency becomes a higher frequency so that an absolute value of a slope of a frequency-speed characteristic in the case of changing a frequency of said actuator by a unit amount is within a predetermined range or is equal to or greater than a predetermined value.

10. An apparatus according to claim 8, wherein the voltage is changed by changing a driving pulse width in said driving circuit for applying the voltage to said electro-mechanical energy conversion element.

11. An apparatus according to claim 8, wherein the voltage is changed by changing a gain of an amplifier in said driving circuit for applying the voltage to said electro-mechanical energy conversion element.

12. A control method for a vibration type actuator which makes driving vibration at a driving unit of a vibration member by applying an alternating signal to an electro-mechanical energy conversion element and uses at least a frequency of the alternating signal as a speed control parameter, said control method comprising the steps of:

applying an alternating signal to the electro-mechanical energy conversion element; and changing a voltage of the alternating signal to be applied to the electro-mechanical energy conversion element so that at least an absolute value of a slope of a frequency-speed characteristic of the actuator is within a desired range in a frequency band of predetermined range.

13. A control method for a vibration type actuator which makes driving vibration at a driving unit of a vibration member by applying an alternating signal to an electro-mechanical energy conversion element and uses at least a frequency of the alternating signal as a speed control parameter, said control method comprising the steps of:

applying an alternating signal to the electro-mechanical energy conversion element; and changing a voltage of the alternating signal to be applied to the electro-mechanical energy conversion element so that an absolute value of a slope of a frequency-speed characteristic of the actuator is equal to or greater than a predetermined value at least in a frequency band of predetermined range.

14. A control method according to claim 12, wherein said changing step includes performing on and off operations of a switching circuit in response to a driving pulse and applying a voltage according to the on and off switching operation to the electro-mechanical energy conversion element, and changing the width of the driving pulse according to the frequency so that the absolute value of the slope of the frequency-speed characteristic of the actuator is within the predetermined range.

15. A control method according to claim 13, wherein said changing step includes performing on and off operations of a switching circuit in response to a driving pulse and applying a voltage according to the on and off switching operation to the electro-mechanical energy conversion element, and changing the width of the driving pulse according to the frequency so that the absolute value of the slope of the frequency-speed characteristic of the actuator is equal to or greater than the predetermined value.

16. A control method for a vibration type actuator which makes driving vibration at a driving unit of a vibration member by applying an alternating signal to an electro-mechanical energy conversion element and controls at least a frequency of an alternating signal as a speed control parameter, said control method comprising the steps of:

applying an alternating signal to the electro-mechanical energy conversion element; and changing a voltage of the alternating signal to be applied to the electro-mechanical energy conversion element in a frequency range higher than a predetermined frequency so that the voltage of the alternating signal decreases as the predetermined frequency becomes a higher frequency.

17. A control method according to claim 16, wherein said changing step includes decreasing the voltage to be applied to the electro-mechanical energy conversion element as the predetermined frequency becomes a higher frequency so that an absolute value of a slope of a frequency-speed characteristic in the case of changing a frequency of the actuator by a unit amount is within a predetermined range or is equal to or greater than a predetermined value.

* * * * *

UNITED STATES PATENT AND TRADEMARK OFFICE
CERTIFICATE OF CORRECTION

PATENT NO. : 6,812,618 B2
DATED : November 2, 2004
INVENTOR(S) : Tadashi Hayashi It is certified that error appears in the above-identified patent and that said Letters Patent is hereby corrected as shown below:

Column 2,
Lines 7 and 14, "can not" should read -- cannot --.

Column 3,
Line 18, "in a the modification" should read -- in a modification --.

Column 4,
Line 55, "can not" should read -- cannnot --.

Column 6,
Line 2, "as" should be deleted.

Column 9,
Lines 24 and 38, "element ¶" should read -- element --.

Column 10,
Line 28, "element ¶" should read -- element --.

Signed and Sealed this

Tenth Day of May, 2005

JON W. DUDAS
*Director of the United States Patent and Trademark Office*